(12) United States Patent
Lemchen et al.

(10) Patent No.: US 11,369,463 B1
(45) Date of Patent: Jun. 28, 2022

(54) TRANSPORTABLE AND REMOVABLE POUCH FOR CONTAINING ORTHODONTIC ALIGNERS

(71) Applicants: Marc Lemchen, New York, NY (US); Jennifer Salzer, New York, NY (US)

(72) Inventors: Marc Lemchen, New York, NY (US); Jennifer Salzer, New York, NY (US)

( * ) Notice: Subject to any disclaimer, the term of this patent is extended or adjusted under 35 U.S.C. 154(b) by 0 days.

(21) Appl. No.: 17/221,276

(22) Filed: Apr. 2, 2021

(51) Int. Cl.
*A61C 19/02* (2006.01)
*A45C 13/10* (2006.01)
*A45C 11/00* (2006.01)

(52) U.S. Cl.
CPC ............. *A61C 19/02* (2013.01); *A45C 11/00* (2013.01); *A45C 13/1069* (2013.01); *A45C 2011/007* (2013.01)

(58) Field of Classification Search
CPC .... A45C 11/00; A45C 2011/007; A61C 19/02
USPC .... 206/63.5, 438, 806, 813, 818; 383/11–29
See application file for complete search history.

(56) References Cited

U.S. PATENT DOCUMENTS

| | | | |
|---|---|---|---|
| 3,372,858 A | 3/1968 | Brody | |
| 3,389,782 A | 6/1968 | Achermann | |
| 3,851,814 A * | 12/1974 | Stage | B65D 31/10 206/439 |
| 4,176,746 A * | 12/1979 | Kooi | B65D 75/5855 206/438 |
| 4,535,930 A | 8/1985 | Ward | |
| 5,588,239 A | 12/1996 | Anderson | |
| 5,598,923 A * | 2/1997 | Owens | A61B 50/312 206/818 |
| 5,655,653 A * | 8/1997 | Chester | A61C 19/02 206/63.5 |
| 6,682,798 B1 | 1/2004 | Kiraly | |
| 8,192,083 B2 * | 6/2012 | Bautista | B65D 33/001 383/11 |
| 9,949,894 B2 * | 4/2018 | Puglisi | A61J 1/16 |
| 2011/0280499 A1 * | 11/2011 | Brundage | A45F 5/02 383/11 |

FOREIGN PATENT DOCUMENTS

| | | |
|---|---|---|
| CH | 683254 | 2/1994 |
| DE | 1761006 | 3/1971 |
| FR | 2112641 | 5/1972 |

(Continued)

*Primary Examiner* — Bryon P Gehman
(74) *Attorney, Agent, or Firm* — Marcus C. Dawes

(57) ABSTRACT

An expandable and collapsible pouch for accommodating an orthodontic appliance while not is use. The pouch may be selectively and repeatedly coupled to a variety of objects. After selectively coupling the pouch to a desired object, the user opens the pouch by expanding at least one collapsible wall or side. The user then removes their orthodontic appliance, inserts it into the open pouch, and then closes the pouch by letting the pouch contract. When the orthodontic appliance is needed again, the user removes the appliance from the pouch and lets the pouch contract into its original position flush against the surface of the object. The pouch is coupled to the object via a magnet disposed within the pouch that is configured to interact with the surface of the object. The pouch also includes a second magnet which assists the pouch maintain a closed position while an appliance is inserted therein.

10 Claims, 3 Drawing Sheets

(56) References Cited

FOREIGN PATENT DOCUMENTS

| FR | 2117818 | 7/1972 |
|----|---------|--------|
| FR | 2591195 | 6/1987 |
| FR | 2617386 | 1/1989 |
| FR | 2693878 | 1/1994 |
| GB | 2054510 | 2/1981 |
| GB | 2426967 | 12/2006 |
| KR | 10-2018-0015447 | 2/2018 |
| WO | 9426602 | 11/1994 |

* cited by examiner

TRANSPORTABLE AND REMOVABLE POUCH FOR CONTAINING ORTHODONTIC ALIGNERS

BACKGROUND

Field of the Technology

The invention relates to the field of orthodontic accessories, namely a new and useful apparatus and method for easily accommodating and transporting orthodontic appliances or accessories, specifically orthodontic aligners.

Description of the Prior Art

Cases or containers have long been used to store, house, or accommodate various orthodontic or oral appliances when not being used, most notably retainers, aligners, or denture appliances. In their most basic form, cases for orthodontic appliances comprise a clam-shell design which, after placing the orthodontic appliance into one of the two halves of the clam shell, is snapped shut to fully envelope the orthodontic appliance and shield it from the outside environment. The case is typically comprised of plastic or other sufficiently hard or rigid material so as to protect the appliance and prevent it from breaking should the appliance be dropped, squeezed, or otherwise mishandled. When the appliance is needed, the case is opened by pulling the clam-shell apart and then removing the appliance, thereby maintaining a degree of cleanliness for the appliance when inside the case.

A problem develops however because even though a case may be effective in keeping an orthodontic or oral appliance sanitary and protected when not being used, the case and any contents contained therein may still be lost or misplaced, thereby denying the user the ability to use their orthodontic or dental appliance or otherwise follow their orthodontic prescription. This problem is particularly acute for young users who tend to be more forgetful and misplace their belongings more frequently than older users. Additionally, when the orthodontic appliance to be contained within a case is a soft aligner, the relative size and bulk of a case becomes a hindrance since such aligners are not likely to be damaged even if they were dropped or squeezed without any sort of protective barrier. In other words, the protection provided by a hard or rigid case which is a necessity for some appliances such as a retainer would become redundant or unnecessary when the same case is used to accommodate a much softer and more malleable aligner.

What is needed therefore is a means and method for keeping an orthodontic aligner sanitary when not in use which is easy to transport and keep with the user at all times. The means should also be convenient to use by being easily adapted to a fit a variety of different tastes and styles for each user without being overly large or difficult to use by even a young user.

BRIEF SUMMARY

The current invention provides an apparatus for accommodating at least one orthodontic appliance when not in use. The apparatus includes a front panel, a back panel, and at least one collapsible side coupled to the front panel and the back panel. The apparatus also includes means for removably and repeatedly attaching the apparatus to an object.

In one embodiment, the apparatus also includes a collapsible bottom that is coupled to the front panel, the back panel, and the at least one lateral collapsible side. Specifically, the at least one lateral collapsible side or the collapsible bottom includes at least one pleat.

In another embodiment, the means for removably and repeatedly attaching the apparatus to the object is a magnet that is disposed within the back panel. In this embodiment, the magnet is configured to interact with a surface of the object.

In a further embodiment, the means for removably attaching the apparatus to the object includes a ring attached to the back panel of the apparatus, the ring being configured to accommodate at least a portion of the object there through.

In one embodiment, the apparatus also includes a base, wherein the base itself includes means for removably attaching the base to a surface of the object as well as means for removably attaching the base to the back panel.

In yet another embodiment, the front panel and the back panel are each shaped so as to match the shape of the orthodontic appliance.

In one embodiment, the apparatus also includes an opening that is defined between the front panel and the back panel and means for selectively closing the opening defined between the front panel and the back panel. Specifically, the means for selectively closing the opening includes a magnet that is disposed within the front panel. In a related embodiment, the means for selectively closing the opening is configured to engage with the means for removably coupling the back panel to the object.

The current invention also provides a method for storing an orthodontic appliance when not in use. The method includes attaching a pouch to a surface of an object, actuating the pouch into an expanded configuration, and then accommodating the orthodontic appliance within the pouch. Next, the pouch is actuated again into a contracted configuration. When the orthodontic appliance is needed, the pouch is then removed from the surface of the object.

In one embodiment, attaching the pouch to the surface of the object involves magnetically attaching a back panel of the pouch to the surface of the object.

In another embodiment, attaching the pouch to the surface of the object involves pressing a back panel of the pouch with an adhesive disposed thereon against the surface of the object. The adhesive on the back panel is covered with a peel-off backing, which when removed, allows the user to press and stick the now exposed sticky surface of the pouch to the object.

In another embodiment, actuating the pouch into an expanded configuration is done by extending at least one collapsible side of the pouch.

In yet another embodiment, the method also includes attaching a base to the surface of the object, attaching the pouch to that base, and then removing the pouch from the base when no longer needed.

In a further embodiment, the method also includes selectively closing an opening of the pouch after inserting the orthodontic appliance into the pouch. Specifically, selectively closing the opening of the pouch includes magnetically attaching a front panel of the pouch either to the back panel of the pouch or to the surface of the object.

In another embodiment, accommodating the orthodontic appliance within the pouch specifically includes inserting the orthodontic appliance into an internal volume within the pouch which matches a shape of the orthodontic appliance itself.

In another embodiment, actuating the pouch into a contracted configuration specifically includes compressing at least one collapsible side of the pouch until the pouch is flush against the surface of the object.

In a related embodiment, actuating the pouch into a contracted configuration specifically includes retracting at least one collapsible side of the pouch through a spring force that is provided by the at least one collapsible side of the pouch until the pouch is flush against the surface of the object.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
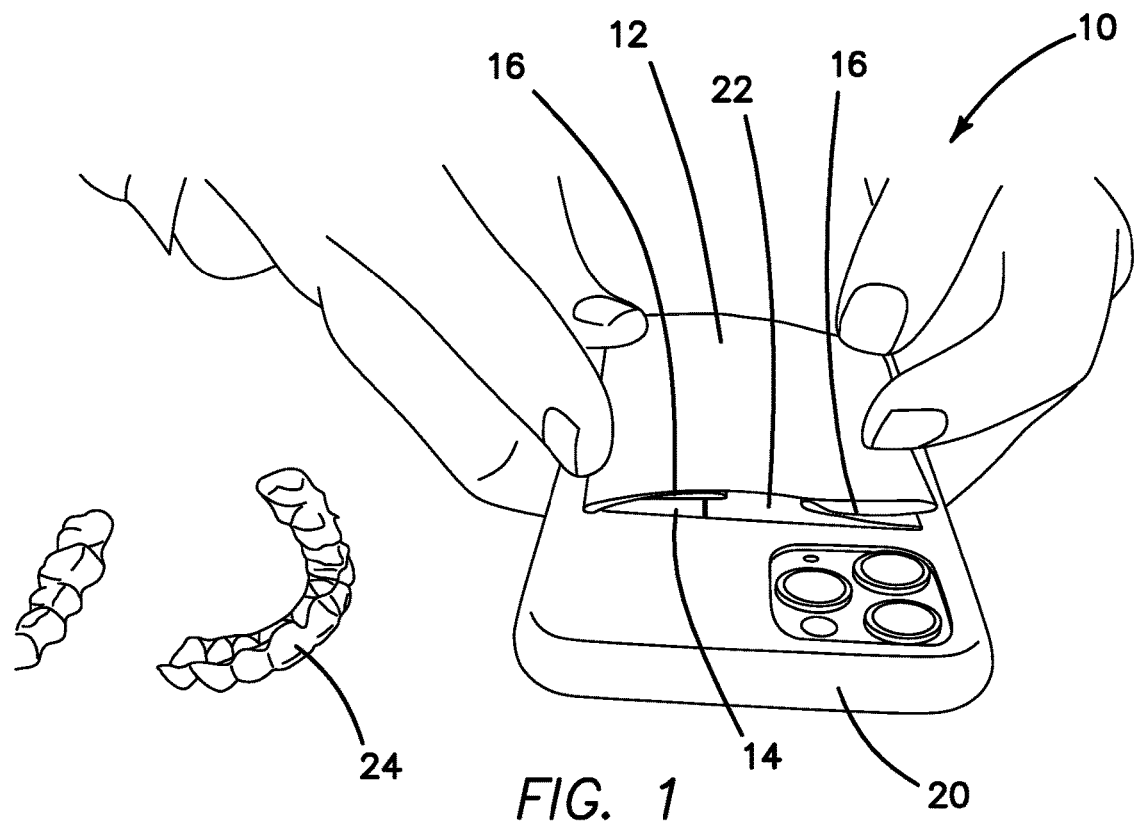
FIG. 1 is a frontal perspective view of a first embodiment of the current device comprising a pouch as it is being coupled to the surface of an object by a user while in a contracted configuration.
Figure 2:
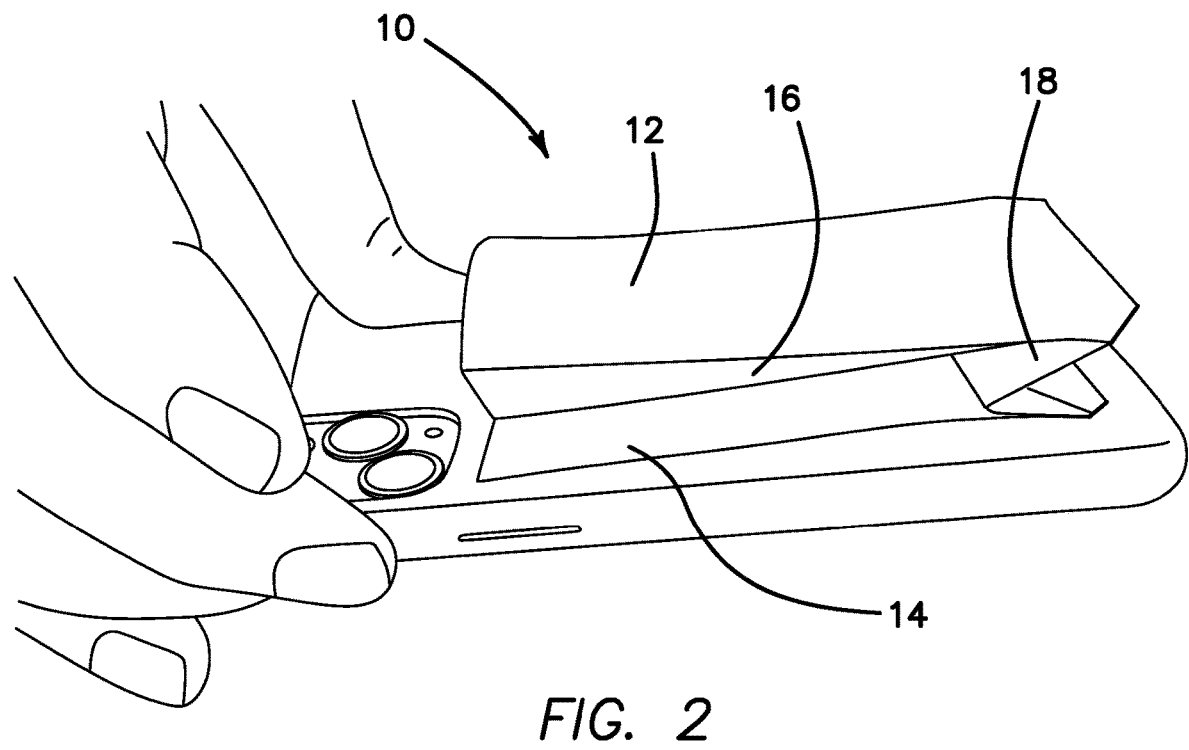
FIG. 2 is a side perspective view of the pouch seen in FIG. 1 after being coupled to the object and after the user has actuated the pouch into an expanded configuration.
Figure 3:
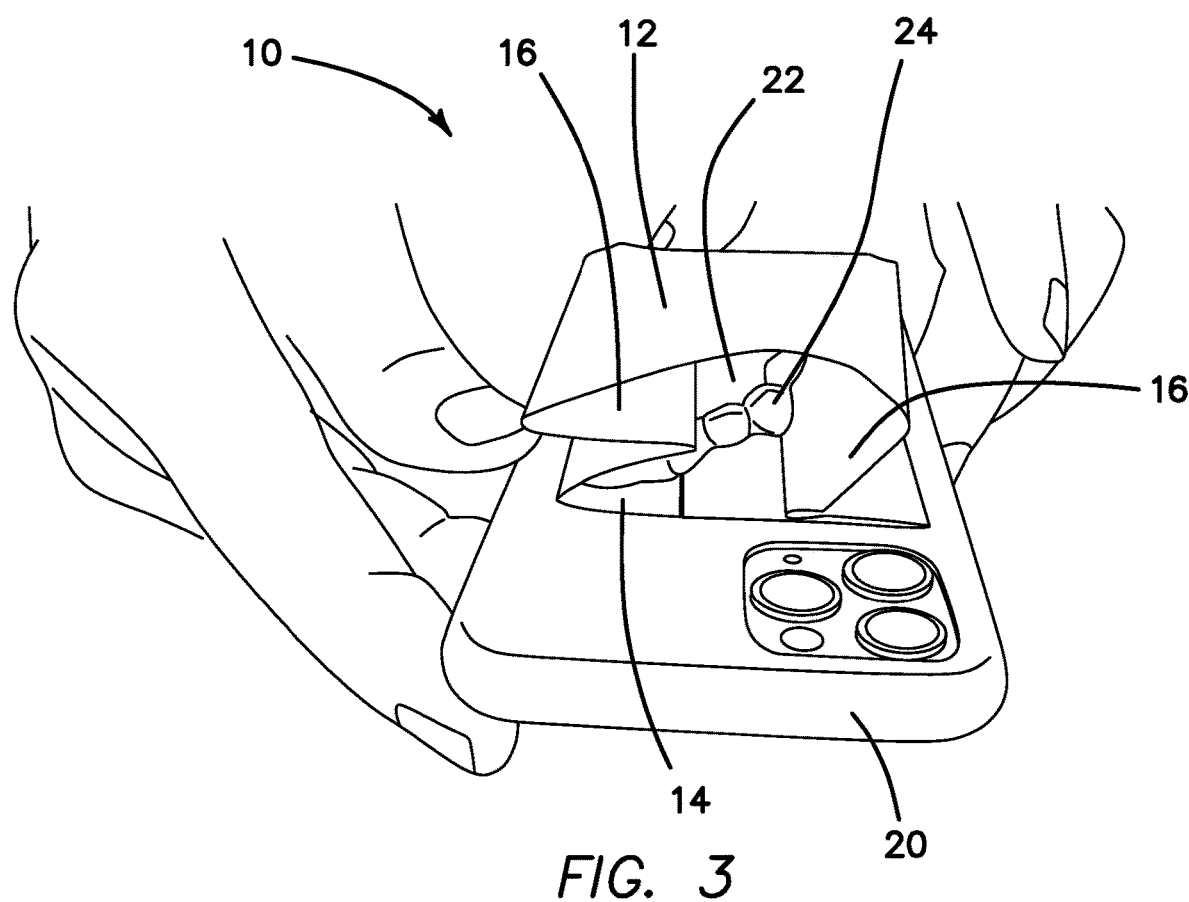
FIG. 3 is a frontal perspective view of the pouch seen in FIG. 2 while the pouch is in the expanded configuration.

Detail of the current invention may be had by turning to FIGS. 1-3 where the aligner pouch may be seen and which is denoted generally by reference numeral 10. The aligner pouch 10 comprises a front panel 12 and a back panel 14, the front panel 12 and the back panel 14 each defining a plane that is parallel with respect to one another. The front panel 12 is coupled or integrally joined to the back panel 14 through a plurality of lateral collapsible sides 16 and at a least one collapsible bottom 18. The front panel 12, back panel 14, and the lateral collapsible sides 16 cooperate to define an internal volume within the aligner pouch 10. An opening 22 is preferably defined in a top or lateral edge of the aligner pouch 10, the opening 22 providing access to the internal volume within the aligner pouch 10. The aligner pouch 10 is preferably comprised of a single piece of material or a single component so that the front panel 12, the back panel 14, the collapsible sides 16, and the collapsible bottom 18 of the aligner pouch 10 are integrally formed with one another, however in an alternative embodiment, the front panel 12, back panel 14, lateral collapsible sides 16, and collapsible bottom 18 are each comprised of different components or portions and are therefore separable and detachable from one another. In yet another alternative embodiment, the opening 22 may be defined along a longitudinal edge of the aligner pouch 10 instead of the lateral edge of the aligner pouch 10 as seen.

The aligner pouch 10 is preferably comprised of silicone or neoprene, however it should be expressly understood that other relatively inexpensive and flexible materials such as paper, cardboard, wax, plastic, or the like may be used without significantly departing from the original spirit and scope of the invention.

Figure 4A:
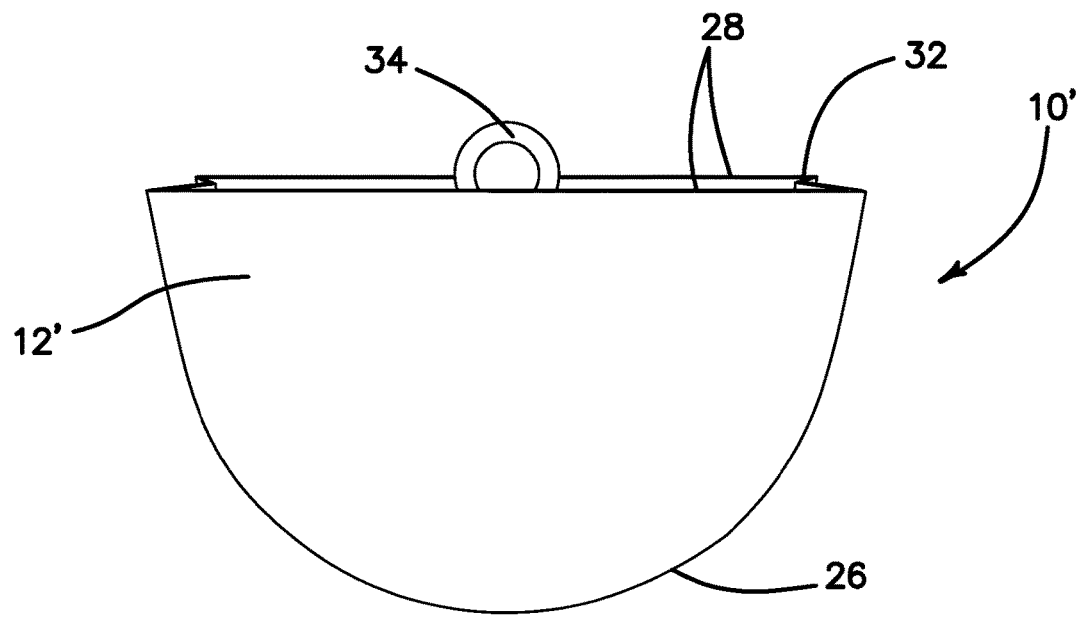
FIG. 4A is a frontal view of an alternative embodiment of the current invention comprising a pouch with a substantially semi-circular shape.
Figure 4B:
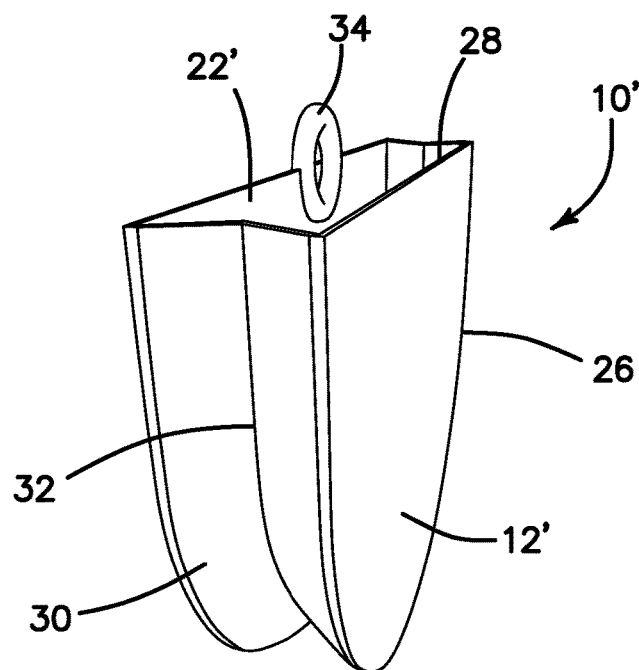
FIG. 4B is a side perspective view of the pouch seen in FIG. 4A.
Figure 4C:
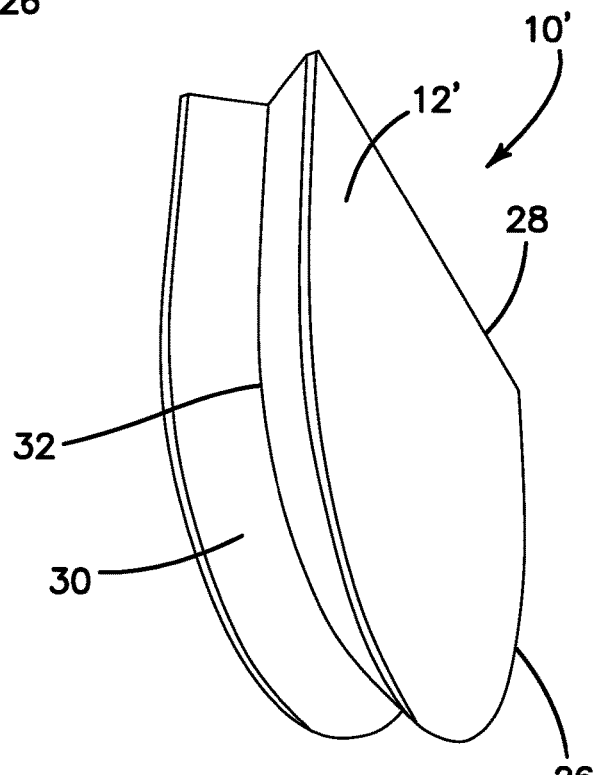
FIG. 4C is an upward orientated perspective view of the pouch seen in FIG. 4A.
Figure 4D:
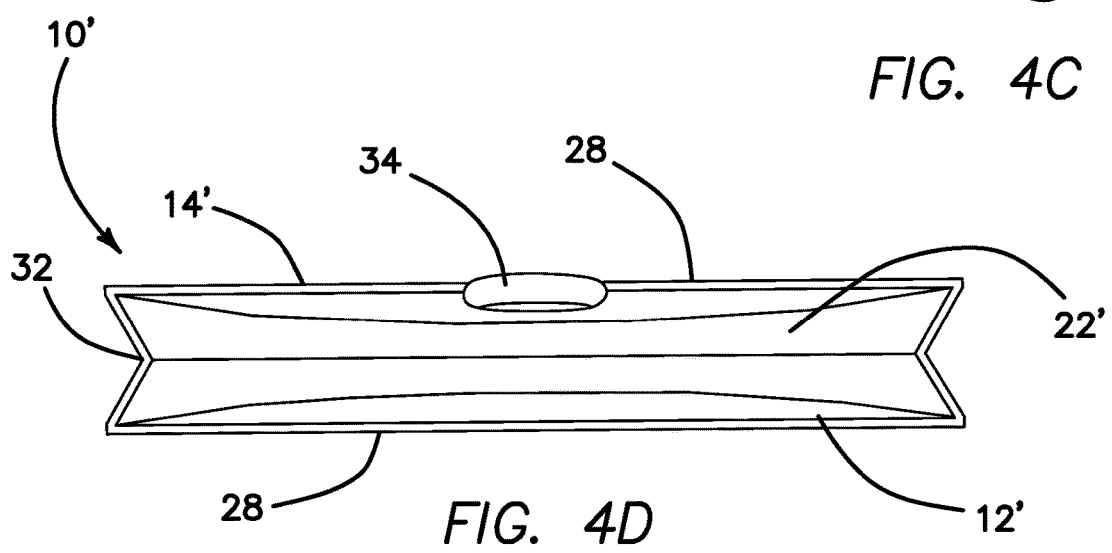
FIG. 4D is a top down view of the pouch seen in FIG. 4A.

Additionally, the aligner pouch 10 as seen in FIGS. 1-3 is substantially rectangular in shape, however it is to be expressly understood that additional or different shapes may be used without departing from the original spirit and scope of the invention. For example, the aligner pouch 10' in a separate embodiment seen in FIGS. 4A-4D may comprise a circular or semi-circular shape which more closely matches the shape of the aligners 24 which may be inserted therein, thereby providing a closer or tighter fitting means for accommodation. Specifically, the front panel 12' and the back panel 14' each comprise a rounded or semi-circular bottom edge 26 and a straight or flat top edge 28 so as to provide the user a maximum space for the opening 22' while still maintaining a tighter or more closely fitting shape for the substantially arch shaped aligner 24. In this embodiment, the aligner pouch 10' comprises a single collapsible surface 30 disposed around the entire arc of the aligner pouch 10' as defined by the front panel 12' and the back panel 14' as best seen in FIG. 4D. The collapsible surface 30 comprises a pleat 32 along its entire length so that the aligner pouch 10' may be expanded or contracted accordingly. The aligner pouch 10' also may comprise a ring 34 coupled to the back panel 14'. The ring 34 permits the user to attach the aligner pouch 10' to a variety of attachment points including hooks, clips, key chains, and the like.

Returning to FIGS. 1-3, the front panel 12, the lateral collapsible sides 16, and the collapsible bottom 18 of the aligner pouch 10 each comprise smooth or substantially smooth edges and surfaces so as to assist the aligner pouch 10 in maintaining a low frictional coefficient and thereby helping it to avoid getting caught or snagged on another object. The back panel 14 however comprises an adhesive or glue disposed over at least a portion thereof, preferably on a rear most facing surface. A peel-off backing initially covers the adhesive on the back panel 14 so that the aligner pouch 10 does not unintentionally stick to the surface of any object until the peel-off backing is removed, thereby exposing the adhesive disposed on the surface beneath. The adhesive provides a means for the back panel 14 and thereby the entire aligner pouch 10 to stick or couple to a surface of another object when the aligner pouch 10 is applied or pressed against the surface of that object. The adhesive may be strong enough so that the aligner pouch 10 may be permanently attached or coupled to the surface it is applied to, or more preferably, the adhesive may be such that the aligner pouch 10 may be first applied to the surface of the object and then subsequently removed without damaging the surface of the object it was applied to. Additionally, the adhesive disposed on the back panel 14 may be resilient enough so that the aligner pouch 10 may be reapplied to the same surface or to a different surface of another object if desired. After removing the peel-off backing, the aligner pouch 10 may be applied or coupled to the object which may be any standard or household object such as but not limited to phones, purses, briefcases, or the surfaces of a desk, headboard, bathroom mirror and the like.

In a related embodiment, the back panel 14 may further comprise one or more magnets that are either coupled to the surface of the back panel 14 or more preferably disposed within the material composing the back panel 14 itself. Specifically, each of the magnets are substantially rectangular or plate shaped so as to be disposed within the thickness of the material comprising the back panel 14. The aligner pouch 10 may be temporarily coupled to any object which is comprised of ferromagnetic material including but not limited to lockers, purses, refrigerators, metal phone cases, briefcases, headboards, and other similar objects by placing the back panel 14 containing the magnet in close proximity to the surface of the object the aligner pouch 10 is to be attached to.

To use the aligner pouch 10, a user first applies the aligner pouch 10 to the surface of an object 20 by first aligning the back panel 14 with a location on the surface where the user desires to place the aligner pouch 10. The user then presses the aligner pouch 10 against the object's surface, thereby engaging the adhesive and/or the magnet disposed on the back panel 14 with the surface of the object 20. It is important to note that the object 20 as seen in FIGS. 1-3 is a smartphone or cell phone, however it should be expressly understood that the object 20 may be any object made from any type of material including but not limited to a phone case, a pocketbook, a wallet or purse, a backpack, a briefcase, a lunch box, an arm band, a workout accessory, or any other similar personal or transportable item now known or later devised. Additionally, the aligner pouch 10 may be affixed or coupled to a stationary object or piece of furniture such as a mirror at a bathroom sink, a bedside table or headboard, a piece of exercise equipment such as a treadmill, and the like.

After the aligner pouch 10 has been coupled to the object 20 of the user's choice, the aligner pouch 10 is opened in one particular embodiment by the user pulling upward on the front panel 12 which unfolds, extends, or otherwise expands the lateral collapsible sides 16 and the collapsible bottom 18 from the configuration seen in FIG. 1 to the configuration seen in FIGS. 2 and 3. As the lateral collapsible sides 16 and the collapsible bottom 18 are expanded, the opening 22 is also expanded or enlarged, thereby providing increased access to the internal volume of the aligner pouch 10. The user may then place or insert an aligner 24 or other orthodontic or dental appliance into the internal volume of the aligner pouch 10, specifically within the volume defined between the front panel 12, the back panel 14, the lateral collapsible sides 16, and the collapsible bottom 18 as seen in FIG. 3. Once placed, the user may secure the aligner 24 within the aligner pouch 10 by pressing or moving the front panel 12 back towards the back panel 14, or alternatively by simply releasing the front panel 12 and letting a spring resistance associated with either the lateral collapsible sides 16 or the collapsible bottom 18 retract or close the aligner pouch 10 and completely envelope the aligner 24 contained therein.

The user may then eat, workout, or complete any other task they wish while the retainer 24 remains securely within the internal volume of the aligner pouch 10, the aligner pouch 10 itself remaining securely coupled or adhered to the surface of the selected object 20. When the user is ready to use the aligners 24 again, the process is largely repeated by first pulling upward on the front panel 12 and once again enlarging the opening 22. The user may then remove the aligner 24 from the aligner pouch 10 and then allow or push the aligner pouch 10 into the retracted or compact configuration seen in FIG. 1.

After removing the aligner 24, the user may keep the aligner pouch 10 disposed on or adhered to the object 20 and then continue to use the object 20 for its normal or intended purpose. For example, if the object 20 is a cell phone as seen in FIG. 1, the object 20 may be placed into the user's pocket or otherwise used as is traditionally known without fear that the aligner pouch 10 will interfere or obstruct any particular use of the object 20. The aligner pouch 10 preferably collapses against the object 20 so that the entire aligner pouch 10 is flush or substantially flush against the surface of the object 20 as seen in FIG. 1 so as to form a reduced or uniform profile, thus preventing the aligner pouch 20 from getting snagged or caught on the user's clothing or other items which may be in the same environment as the aligner pouch 10. Alternatively, after the aligner 24 is removed, the user may remove the aligner pouch 10 from the object 20 completely by simply peeling or detaching the aligner pouch 10 from the object 20. The user may then store the aligner pouch 10 in a separate container for later or subsequent use, or dispose of the aligner pouch 10 completely by throwing it away.

In one particular embodiment, the aligner pouch 10 further comprises means for selectively closing the opening 22. The means for selectively closing the opening 22 may comprise a snap or friction fit button which allows the user to close the opening 22 by pressing the front panel 12 into or against the back panel 14 until the coupling means are engaged whenever the aligner 24 is inserted into the internal volume of the aligner pouch 10. Conversely, whenever the aligner 24 is to be removed from the aligner pouch 10, the front panel 12 is pulled from the back panel 14 until the coupling means are disengaged or released. In another related embodiment, the front panel 12 comprises a second magnet which interacts with either the surface of the object 20 or with the first magnet disposed within the back panel 14 so as to open and close the opening 22 by selectively bringing the second magnet into proximity with the first magnet or disengaging the second magnet from the first magnet, respectively. Alternatively, the coupling means may also comprise swatches of hook and loop fabric, clips, or other equivalent means now known or later devised.

In one specific embodiment, the means for selectively closing comprises a top flap attached to either the front panel 12 or back panel 14 of the collapsible aligner pouch 10 so that when the aligner pouch 10 is extended or expanded, the top flap moves into position over the opening 22. Specifically, the flap is initially in a position which is perpendicular relative to the front panel 12 or back panel 14 of the aligner pouch 10. After the aligner pouch 10 is expanded, the flap is then rotated relative to the surface it is coupled to so as to block or obstruct the opening 22, thereby closing the opening 22 while also serving as a support member for maintaining the aligner pouch 10 in an expanded position. To close the aligner pouch 10, the flap is pushed into the aligner pouch 10 allowing the pouch to "snap" into a closed position. The flap is held in a folded position parallel relative to the front panel 12 or back panel 14 of the aligner pouch 10 by either the first or second magnets, or by the pressure or overall weight of the contracted aligner pouch 10.

In FIGS. 1-3, the lateral collapsible sides 16 and the collapsible bottom 18 are seen as each comprising a plurality of folds or bends which permits each respective surface to fold in on itself. The aligner pouch 10 is further comprised of a semi-rigid material such as silicone so that when the aligner pouch 10 is expanded or contracted, the lateral collapsible sides 16 and collapsible bottom 18 "snap" or "spring" open or closed, respectively, when a particular threshold of movement has been reached. It should be expressly noted however that alternative configurations other that what is explicitly shown may be used. For example, the lateral collapsible sides 16 and the collapsible bottom 18 may comprise a plurality of pleats or a collapsible frame which automatically expand or contract when the aligner pouch 10 is opened and closed, respectively.

In an alternative embodiment, the aligner pouch 10 may further comprise a separate removable base which is removable relative to both the object 20 and the aligner pouch 10. The base is preferably comprised of the same soft yet durable material as the aligner pouch 10 and is also preferably sized and shaped to match the footprint or profile of the aligner pouch 10 itself. Additionally, the base further comprises at least one surface which has an adhesive material or magnet disposed thereon, preferably on a back surface which is configured to contact and couple to an object. Specifically, the base is disposed over a surface of the object 20 which the user wishes to apply the aligner pouch 10 and then coupled or affixed to the object by having the back surface of the base pressed against the object 20. Once properly secured, the aligner pouch 10 in turn may then be coupled to the base by pressing the back surface of the back panel 14 against a front surface of the base. The adhesive and or first magnet disposed on the back panel 14 of the aligner pouch 10 interacts with another adhesive or magnet disposed within the base, thereby temporarily coupling the aligner pouch 10 to the base and ensuring that as the object 20 is moved or used, the base and the aligner pouch 10 move along with it. The aligner pouch 10 may then be used in the same manner described above, namely wherein the aligner pouch 10 is expanded or contracted to insert or retrieve the aligner 24, respectively. Similarly, when use of the aligner pouch 10 is no longer desired, the aligner pouch 10 may be removed from the base by being pulled back from the base and then being stored or disposed of. A second, new aligner pouch 10 may then be applied to the same base and then used as needed for the same aligner 24.

In one particular embodiment, the adhesive disposed on the base is of a stronger or more resilient type of adhesive as compared to the adhesive disposed on the back surface of the back panel 14. In other words, it is a further aspect of the current invention that the base be permanently or substantially permanently attached or coupled to the object 20 as opposed to the aligner pouch 10 which is allowed to be more freely removable or transportable. Additionally, the base and aligner pouch 10 may comprise other means for coupling to each including but not limited to corresponding segments or patches of hook and loop fabric, corresponding male and female snap buttons or friction fits, or other equivalent mechanical means now known or later devised, The material comprising the aligner pouch 10 may be any color or shade, and may further include any pattern or design. The aligner pouch 10 may further be personalized with graphical images, text, or feature advertisements for aligner manufacturers or a doctor's practice, among many other options.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. An apparatus for accommodating at least one orthodontic appliance when not in use, the apparatus comprising:
   a front panel;
   a back panel;
   at least one collapsible side coupled to the front panel and the back panel; and
   means for removably coupling the apparatus to an object, wherein the at least one collapsible side is configured to change a relative size of an opening disposed between the front panel and the back panel when the front panel is moved relative to the back panel, and wherein the at least one collapsible side comprises a material configured to provide a spring force when the front panel is moved relative to the back panel.

2. The apparatus of claim 1 further comprising a collapsible bottom coupled to the front panel, the back panel, and the at least one lateral collapsible side.

3. The apparatus of claim 2 wherein the at least one lateral collapsible side or the collapsible bottom comprises at least one pleat.

4. The apparatus of claim 1 where the means for removably coupling the apparatus to the object comprises a magnet disposed within the back panel, wherein the magnet is configured to interact with a surface of the object.

5. The apparatus of claim 1 where the means for removably coupling the apparatus to the object comprises a ring coupled to the back panel of the apparatus, the ring being configured to accommodate at least a portion of the object there through.

6. The apparatus of claim 1 further comprising a base, wherein the base comprises means for removably coupling the base to a surface of the object and means for removably coupling the base to the back panel.

7. The apparatus of claim 1 wherein the front panel and the back panel each comprise a shape which matches a shape of the orthodontic appliance.

8. The apparatus of claim 1 further comprising:
an opening defined between the front panel and the back panel; and
means for selectively closing the opening defined between the front panel and the back panel.

9. The apparatus of claim 8 where the means for selectively closing the opening defined between the front panel and the back panel comprises a magnet disposed within the front panel.

10. The apparatus of claim 8 where the means for selectively closing the opening defined between the front panel and the back panel is configured to engage with the means for removably coupling the apparatus to the object.

* * * * *